(12) United States Patent
Kruse

(10) Patent No.: US 9,758,124 B2
(45) Date of Patent: Sep. 12, 2017

(54) FRONTAL AIRBAG SYSTEMS FOR OBLIQUE CRASH PROTECTION

(71) Applicant: Autoliv ASP, Inc., Ogden, UT (US)

(72) Inventor: Dion Kruse, Alingsas (SE)

(73) Assignee: Autoliv ASP, Inc., Ogden, UT (US)

( * ) Notice: Subject to any disclaimer, the term of this patent is extended or adjusted under 35 U.S.C. 154(b) by 50 days.

(21) Appl. No.: 14/856,276

(22) Filed: Sep. 16, 2015

(65) Prior Publication Data

US 2017/0072897 A1    Mar. 16, 2017

(51) Int. Cl.
| | |
|---|---|
| *B60R 21/239* | (2006.01) |
| *B60R 21/01* | (2006.01) |
| *B60R 21/2338* | (2011.01) |
| *B60R 21/203* | (2006.01) |
| *B60R 21/205* | (2011.01) |
| *B60R 21/013* | (2006.01) |
| *B60R 21/0136* | (2006.01) |
| *B60R 21/00* | (2006.01) |

(52) U.S. Cl.
CPC .......... *B60R 21/239* (2013.01); *B60R 21/013* (2013.01); *B60R 21/0136* (2013.01); *B60R 21/203* (2013.01); *B60R 21/205* (2013.01); *B60R 21/2338* (2013.01); *B60R 2021/0009* (2013.01); *B60R 2021/01013* (2013.01); *B60R 2021/01211* (2013.01); *B60R 2021/01238* (2013.01); *B60R 2021/2395* (2013.01); *B60R 2021/23384* (2013.01)

(58) Field of Classification Search
CPC .......... B60R 21/239; B60R 2021/2395; B60R 2021/0009; B60R 2021/23324

IPC .................................................... B60R 21/239
See application file for complete search history.

(56) References Cited

U.S. PATENT DOCUMENTS

| | | | | |
|---|---|---|---|---|
| 5,202,831 A | * | 4/1993 | Blackburn ........... | B60N 2/0276 180/282 |
| 5,234,228 A | * | 8/1993 | Morota .................. | B60R 21/017 180/273 |
| 6,497,183 B2 | * | 12/2002 | Demarquilly ......... | B60R 19/205 105/392.5 |
| 6,517,108 B1 | * | 2/2003 | Vinton .................. | B60R 21/239 280/735 |
| 6,945,559 B2 | * | 9/2005 | Kassman .............. | B60R 21/239 280/735 |

(Continued)

FOREIGN PATENT DOCUMENTS

| | | |
|---|---|---|
| GB | 2394919 A | 5/2004 |
| WO | WO0306276 A2 | 1/2003 |

*Primary Examiner* — Ruth Ilan
(74) *Attorney, Agent, or Firm* — Stoel Rives LLP

(57) ABSTRACT

An inflatable airbag system provides cushioning restraint of a vehicle occupant during an impact event of a vehicle. The airbag system can be configured to be mounted to a frontal region of a vehicle. The airbag system includes an inflatable airbag and a selectively actuatable vent that can be actuated in response to detection of an oblique impact event and/or a small overlap collision event. The selectively actuatable vent is actuated to open to provide additional venting and thus a lower pressure within the inflatable airbag. A lower pressure can reduce force and momentum on the vehicle occupant's head at an offset angled contact with the airbag. A lower pressure may also prevent the occupant from deflecting or rolling off of an airbag and colliding with other surfaces within the vehicle.

17 Claims, 10 Drawing Sheets

(56) References Cited

U.S. PATENT DOCUMENTS

| | | | |
|---|---|---|---|
| 2003/0214124 A1 | 11/2003 | DePottey et al. | |
| 2006/0192370 A1* | 8/2006 | Abe | B60R 21/0132 |
| | | | 280/735 |
| 2009/0224519 A1* | 9/2009 | Fukawatase | B60R 21/233 |
| | | | 280/736 |
| 2010/0133798 A1* | 6/2010 | Fukawatase | B60R 21/2338 |
| | | | 280/743.2 |
| 2015/0054267 A1* | 2/2015 | Komamura | B60R 21/276 |
| | | | 280/735 |
| 2015/0258958 A1* | 9/2015 | Belwafa | B60R 21/233 |
| | | | 280/729 |
| 2015/0258959 A1* | 9/2015 | Belwafa | B60R 21/233 |
| | | | 280/729 |
| 2015/0274116 A1* | 10/2015 | Jaradi | B60R 21/0136 |
| | | | 701/45 |
| 2015/0329073 A1* | 11/2015 | Buchholz | B60R 21/239 |
| | | | 280/737 |
| 2015/0336532 A1* | 11/2015 | Lee | B60R 21/239 |
| | | | 280/729 |
| 2016/0144820 A1* | 5/2016 | Shin | B60R 21/239 |
| | | | 280/735 |
| 2017/0015266 A1 | 1/2017 | El-Jawahri et al. | |

* cited by examiner

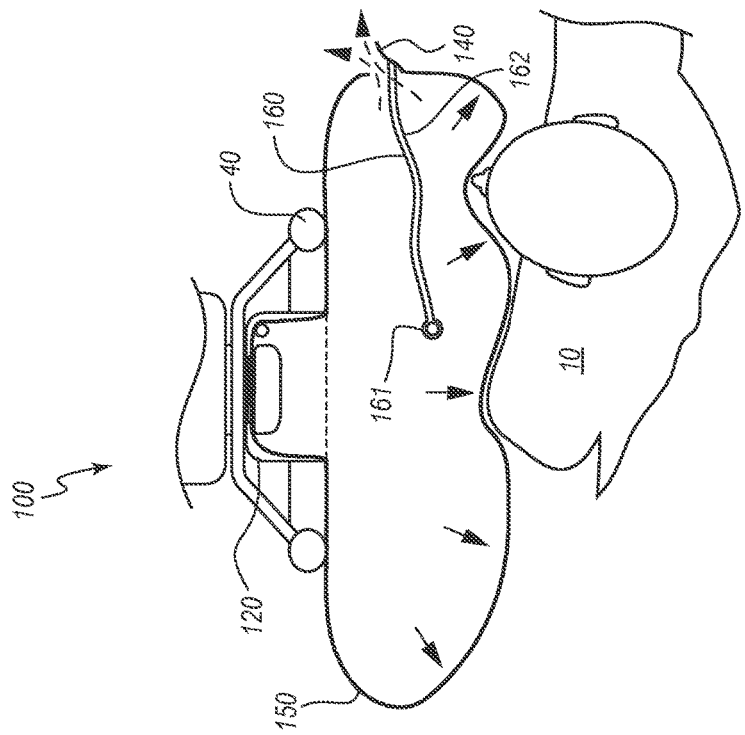
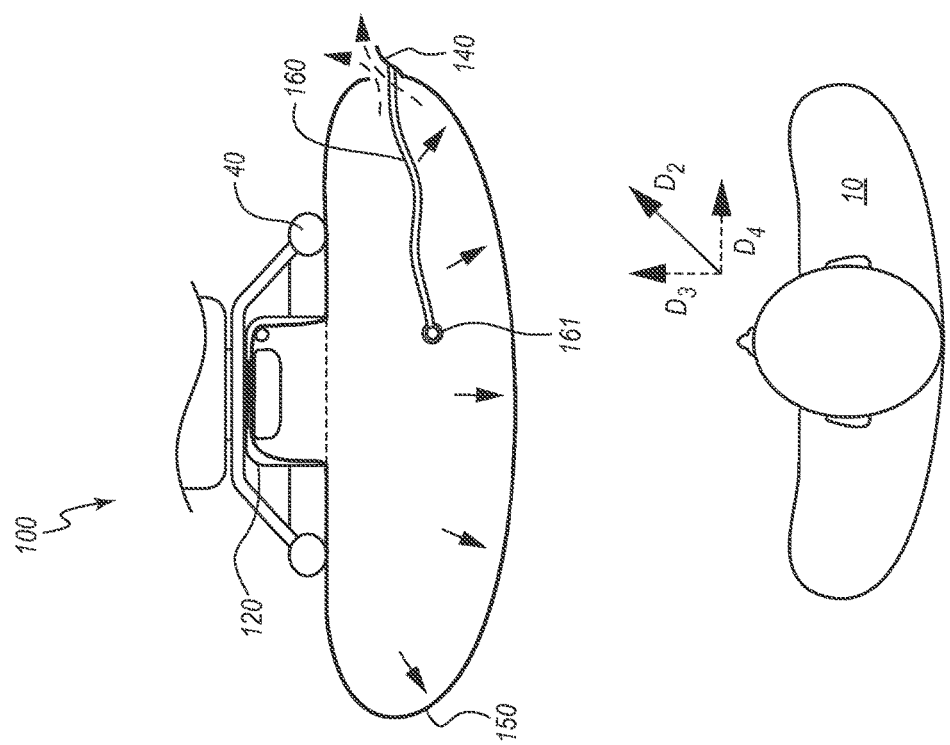
FIG. 5B
FIG. 5A

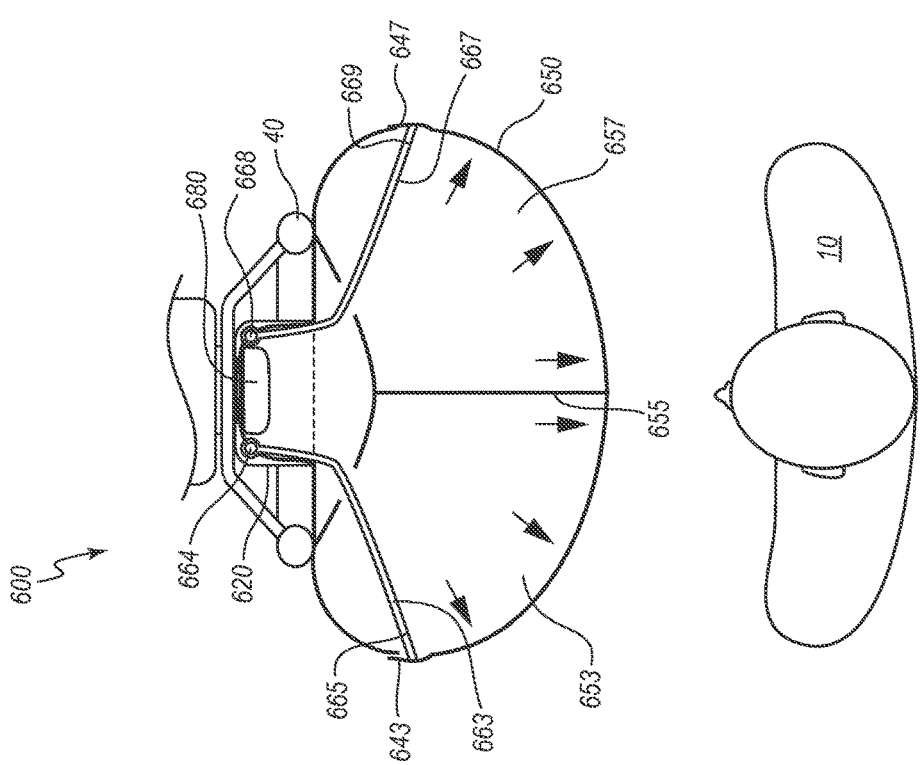

FRONTAL AIRBAG SYSTEMS FOR OBLIQUE CRASH PROTECTION

TECHNICAL FIELD

The present disclosure relates generally to the field of automotive protective systems. More specifically, the present disclosure relates to frontal airbag systems that are configured to deploy in various configurations from a steering wheel, instrument panel, seat, or other vehicle components in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered to be limiting of the disclosure's scope, the embodiments will be described and explained with specificity and detail in reference to the accompanying drawings.

FIG. 5A is a top view of the inflatable airbag system of FIG. 1 deployed to the second configuration.

FIG. 5B is a top view of an occupant being received by the deployed inflatable airbag system of FIG. 1 during an oblique collision event.

FIG. 6 is a top view of an inflatable airbag system, according to another embodiment, comprising multiple chambers in a normal deployment.

DETAILED DESCRIPTION OF PREFERRED EMBODIMENTS

Figure 1:
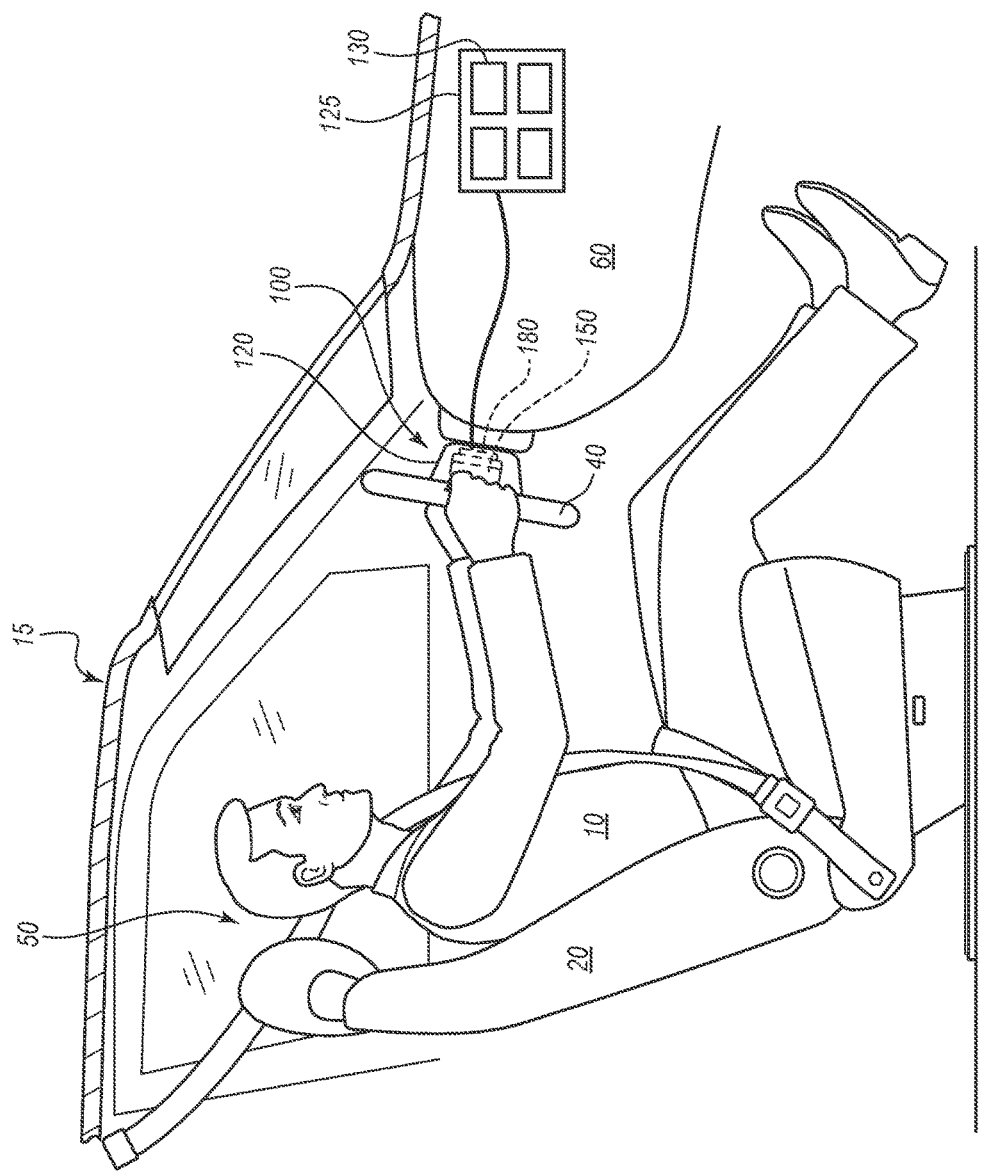
FIG. 1 is a side view of an interior of a vehicle having an inflatable airbag system, according to one embodiment of the present disclosure, prior to deployment.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. With respect to a vehicle, the term "longitudinal" refers to a direction which runs from the rear of the vehicle to the front of a vehicle, or vice versa. The term "lateral" refers to a direction which runs from the driver side of the vehicle to the passenger side of the vehicle, or vice versa, and is perpendicular to the longitudinal direction.

Inflatable airbag systems are widely used to minimize occupant injury in an impact event, or collision scenario. Airbag modules or assemblies have been installed at various locations within a vehicle, including, but not limited to, in the steering wheel or instrument panel, within the side doors or side seats, adjacent to the roof rail of the vehicle, in an overhead position, or at the knee or leg position. In the following disclosure, "airbag" generally refers to a frontal airbag.

Frontal airbags are typically installed in the steering wheel and/or instrument panel of a vehicle. During installation, the airbags are rolled, folded, or both, and are retained in the rolled/folded state within an airbag housing. During a collision, vehicle sensors trigger the activation of an actuator, which rapidly fills the airbag with inflation gas. An actuator may comprise, for example, an inflator that provides inflation gas. The airbag rapidly changes conformations from the rolled/folded or pre-deployed configuration to an expanded or deployed configuration. As disclosed herein, the expanded or deployed configuration of the airbag may be at least partially determined by one or more vents that may be actuated before, during, or after a collision.

Collisions may occur in a variety of modes. For example, a frontal collision can be defined as an impact event, or collision, wherein the post-collision trajectory of one or more occupants is longitudinal, meaning that the trajectory is aligned or substantially aligned with the longitudinal axis of the vehicle. In other words, in a frontal collision, the post-collision trajectory of the one or more occupants mainly comprises a longitudinal component. A frontal collision may be one mode of collision or type of collision.

An oblique collision is another mode of collision or type of collision which can include an impact event wherein the post-collision trajectory of the one or more occupants is oblique, meaning that the post-collision trajectory of the one or more occupants has a lateral component, as well as a longitudinal component. Examples of types of collisions wherein the post-collision trajectory of the one or more occupants can be oblique include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test(s). The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012). As used herein, an oblique collision (crash, impact, etc.) is intended to encompass any of the foregoing described collisions and any other collisions in which an occupant's post-collision trajectory as a result of the impact includes both a longitudinal direction or component and a lateral direction or component. In the present disclosure, the longitudinal component of an occupant's post-collision trajectory during or after an oblique collision may be oriented in the car-forward direction.

As described above, the lateral component of the post-collision trajectory of the one or more occupants runs perpendicular to the longitudinal component, and is parallel to the surface of the road below the vehicle. In an oblique collision, the lateral component of the post-collision trajectory of the one or more occupants may be greater than or less than the longitudinal component, and may cause the one or more occupants to travel either inboard (i.e., toward the center of the vehicle), or outboard (i.e., toward the outside of the vehicle, or toward the nearest vehicle side panel).

In an oblique collision, the lateral component of the post-collision trajectory of the one or more occupants can cause an occupant to contact a deployed airbag off of the center of the airbag, or deflect laterally off of the airbag, thereby decreasing the effectiveness and utility of the inflatable airbag system. The one or more occupants in the oblique collision who laterally deflect off of a deployed airbag could then strike another surface of the vehicle, such as an instrument panel or a window, which may result in injury to the one or more occupants. Violent or otherwise harmful head and neck rotation of an occupant may also result from laterally deflecting off of an airbag. As disclosed herein, manipulation of a deployed configuration of an airbag, such as during or after an oblique collision, by the use of one or more vents may prevent the one or more occupants from deflecting, or rolling, off of the airbag, thereby reducing a risk of injury to the one or more occupants.

FIG. 1 is a side view of an interior of a vehicle 15 having an inflatable airbag system 100, according to one embodiment, prior to deployment. The inflatable airbag system 100 is configured to deploy to receive and provide collision protection to an occupant 10. The occupant 10 is seated on a seat 20 in a normal seating position 50 (i.e., a position typically occupied by an occupant of the vehicle 15; a position in which the vehicle 15, including the seat 20, is designed and configured to carry an occupant). As can be appreciated, the pre-deployed state can also be referred to as a pre-deployed configuration, undeployed state, or undeployed configuration.

The inflatable airbag system 100 comprises a control unit 125, one or more vehicle sensors 130, an airbag housing 120, and an airbag 150 (or inflatable airbag cushion).

The control unit 125 may collect information, such as from the one or more sensors 130, to determine when to deploy the airbag 150. The control unit 125 may signal an actuator 104 to provide inflation gas to the airbag 150. The control unit may receive input from the one or more vehicle sensors 130 and use the data to determine one or more of impact ratio, an impact angle, and/or a collision type of a collision event.

The one or more vehicle sensors 130 (e.g., accelerometers) may be coupled to, integrated in, or in communication with the control unit 125, such that the one or more vehicle sensors 130 can transmit electrical signals to the control unit 125. For example, the one or more vehicle sensors 130 may transmit to the control unit 125 an electrical signal indicating a collision. The control unit 125 may also be in physical or electrical communication with other elements inside the vehicle 15, such as a steering wheel 40 or an instrument panel 60.

As shown in FIG. 1, the inflatable airbag system 100 can be configured to be mounted to the steering wheel 40 of the vehicle 15. The airbag housing 120 may be mounted within the steering wheel 40. The airbag 150 may be rolled or folded in a compact state in an undeployed configuration, and stored inside the airbag housing 120. In other embodiments, the housing 120 of the inflatable airbag system 100 can be mounted on the passenger side of the vehicle 15, for example, in the instrument panel 60. In still other embodiments, the housing may be mounted in a seat 20 of the vehicle 15 so as to provide cushioning restraint for collision protection to occupants in a back seat of the vehicle 15.

Figure 2:
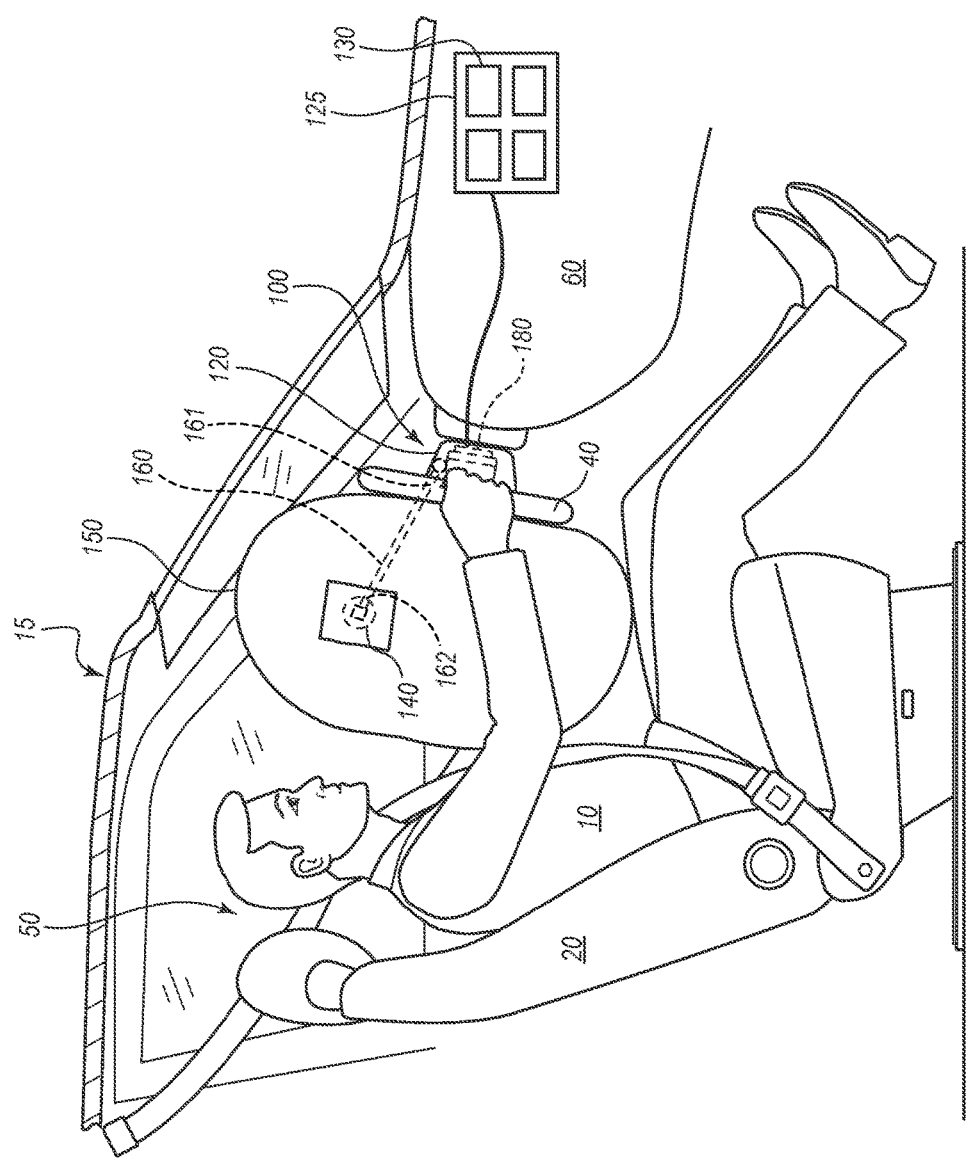
FIG. 2 is another side view of the vehicle and inflatable airbag system of FIG. 1 deployed to a first configuration.
Figure 3:
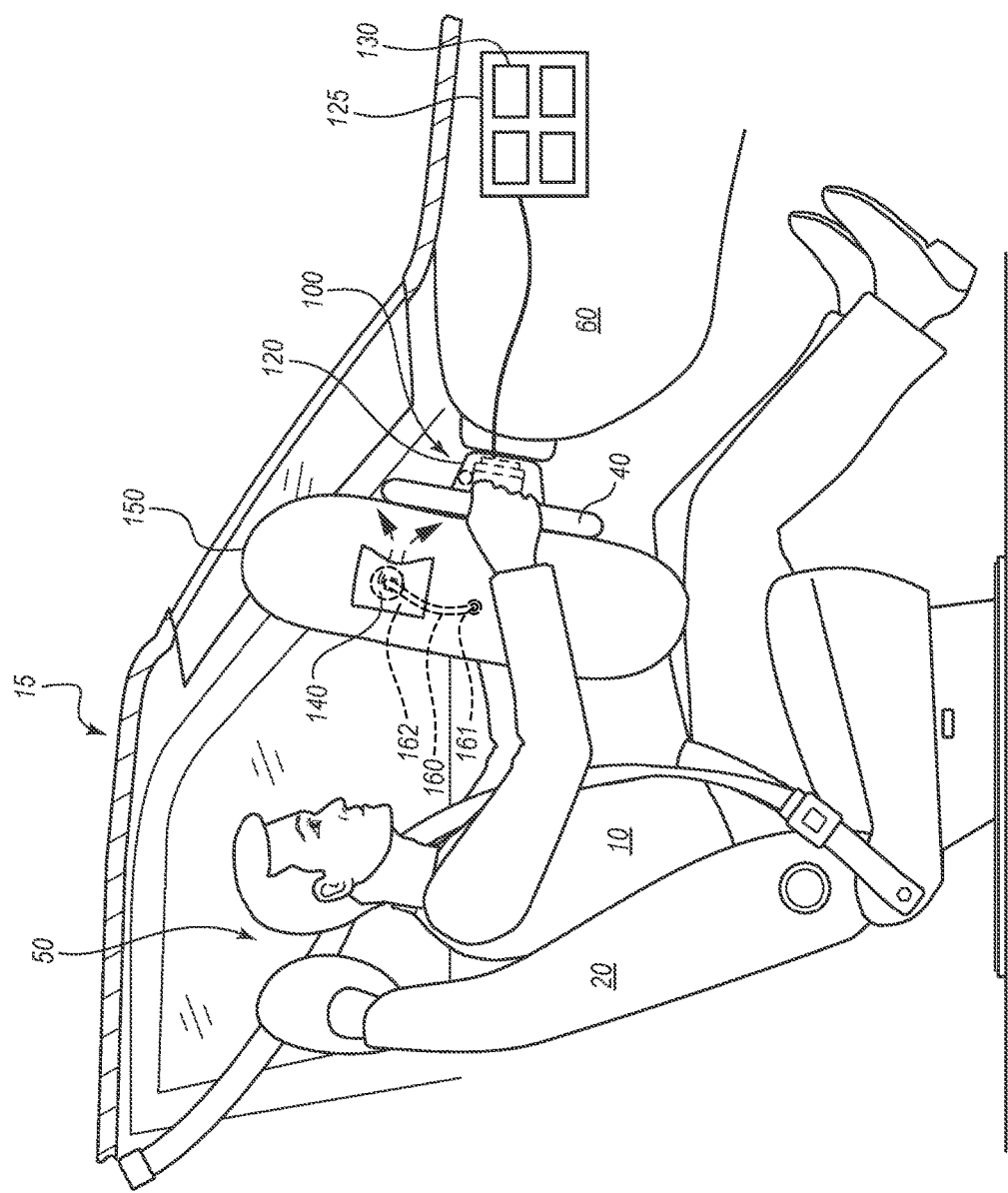
FIG. 3 is another side view of the vehicle and inflatable airbag system of FIG. 1 deployed to a second configuration.

The airbag 150 is configured to receive inflation gas from the actuator 104 to inflate and expand toward the occupant 10. The inflatable airbag system 100 may be configured to be deployed to various configurations to provide frontal and oblique collision protection. For example, as shown in FIG. 2 and discussed below, the airbag 150 can deploy to a first configuration in response to a frontal, or substantially frontal collision. As shown in FIG. 3 and discussed below, the airbag 150 can deploy to a second configuration in response to an oblique collision.

The one or more sensors 130 can be used to detect the impact caused by a collision event. For example, a first sensor can sense or detect the amount of longitudinal impact applied to the vehicle 15, and a second sensor can sense or detect the amount of lateral impact applied to the vehicle 15. The first sensor can send a signal to the control unit 125 when a threshold amount of longitudinal impact is detected, and the second sensor can send a signal to the control unit 125 when a threshold amount of lateral impact is detected. In some embodiments, the impact from a frontal collision event may trigger a signal from the first sensor and not the second sensor, causing deployment of the airbag 150 to the first configuration. By contrast, the impact from an oblique collision event may trigger signals from both the first and second sensors, causing deployment of the airbag 150 to the second configuration.

In other embodiments, one or more sensors 130 may send to the control unit 125 a signal which indicates an amount of lateral and longitudinal impact of a collision, which may then be compared by the control unit 125 in order to determine a type or mode of collision (e.g., frontal collision, oblique collision). If the type of collision determined by the control unit 125 is an oblique collision, then a signal may be sent to the inflatable airbag system 100 which triggers a deployment of the airbag 150 to the second configuration.

In other embodiments, an oblique collision event may cause the one or more vehicle sensors 130 to detect an impact ratio and/or an impact angle that indicates an oblique type collision event.

As will be described more fully below, in the first configuration the deployed airbag may maintain an internal gas pressure that is relatively higher than the internal gas pressure within the deployed airbag of the second configuration. In the second configuration, the airbag may deploy while allowing a portion of the inflation gas to vent out of the airbag during or after deployment of the airbag, leading to a relatively lower internal gas pressure inside the deployed airbag. A deployment of the airbag to the first configuration may be referred to as a "normal" deployment. A deployment of the airbag to the second configuration may be referred to as a "soft" deployment. Alternatively, the airbag in a normal deployment may be referred to as "unvented," while the airbag in a soft deployment may be referred to as "vented."

FIG. 2 is another side view of the interior of the vehicle 15 and inflatable airbag system 100 of FIG. 1 in a normal deployment. The airbag 150 comprises a selectively actuatable vent 140, which is held or otherwise maintained in a closed configuration. The normal deployment may be triggered in response to a frontal collision, as detected by the one or more vehicle sensors 130 and control unit 125. The signal sent by the control unit 125 indicating a frontal collision is sent to the inflatable airbag system 100, which allows a tether 160, having a first end 161 and a second end 162, to remain attached to the airbag housing 120 at the first end 161. The attached tether 160 holds the vent 140 in the closed configuration during deployment, such that the airbag 150 maintains a relatively higher internal gas pressure during and after deployment. The normal deployment may be advantageous to the occupant 10 during a frontal collision where the momentum of the occupant 10 causes the occupant 10 to move in a substantially longitudinal car-forward direction, with little or no movement in the lateral inboard or outboard directions.

FIG. 3 is another side view of the interior of the vehicle 15 and inflatable airbag system 100 of FIG. 1 in a soft deployment. In the soft deployment, the vent 140 is transitioned or otherwise changed to an open configuration, which allows a greater quantity of inflation gas to vent from the airbag 150. The soft deployment may be triggered as a result of an oblique collision as detected by the one or more vehicle sensors 130 and/or control unit 125. A signal indicating an oblique collision may be sent to the inflatable airbag system 100 by the control unit 125, which causes the tether 160 to become uncoupled or detached from the airbag housing 120 at the first end 161. The detachment of the first end 161 of the tether 160 from the airbag housing 120 changes the vent 140 to an open configuration, allowing a portion of inflation gas to escape the airbag 150, thereby maintaining a relatively lower internal gas pressure within the airbag 150.

Proactively modifying the configuration of an airbag to deploy in a soft deployment before or during deployment may provide greater protection to the vehicle occupant 10 in an oblique crash event. For example, in oblique collisions where the occupant 10 has an oblique post-collision trajectory, the soft deployment may allow for greater deformation of the airbag 150 to the occupant 10, which may prevent the occupant 10 from deflecting off of the airbag 150 toward the instrument panel 60 or other surfaces of the interior of the vehicle 15, and may reduce violent and/or otherwise harmful head rotation. FIGS. 5A and 5B, which are discussed more fully below, depict an occupant 10 being received by an airbag 150 in a soft configuration during an oblique collision.

Figure 4A:
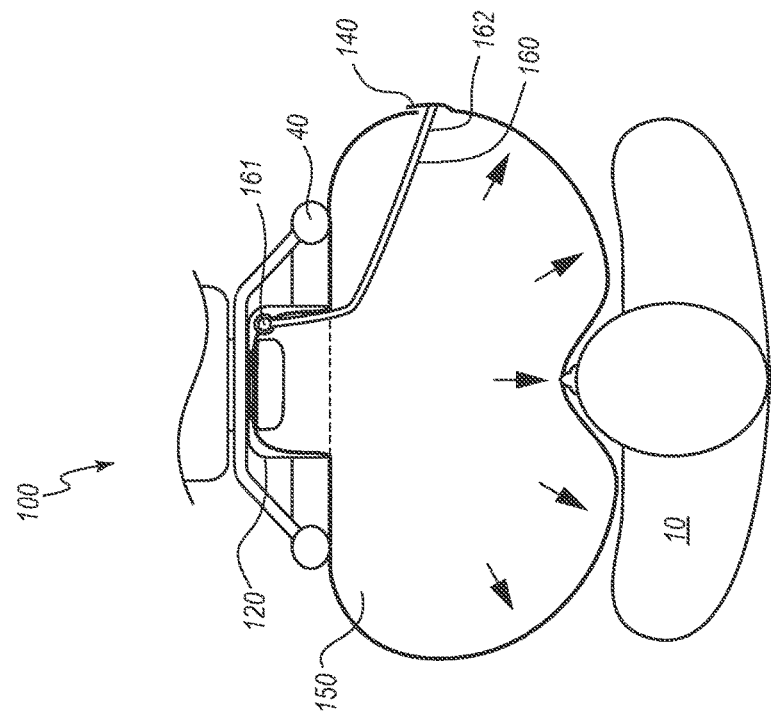
FIG. 4A is a top view of the inflatable airbag system of FIG. 1 deployed to the first configuration.

FIG. 4A is a top view of the occupant 10 and inflatable airbag system 100 of FIG. 2 in a normal deployment, and before the occupant 10 is received by the airbag 150. The airbag 150 extends from the steering wheel 40 in the car-rearward direction, fully deployed and unvented. The tether 160 is attached at the first end 161 to the airbag housing 120 and is also attached at the second end 162 to the vent 140, which sustains the vent 140 in the closed configuration. As described above, in a normal deployment, the deployed airbag 150 may maintain a relatively higher internal gas pressure (e.g., as compared to that of the deployed airbag 150 in a soft deployment), which may be advantageous to providing collision protection to the occupant 10 in the event of a frontal impact, wherein the post-collision trajectory of the occupant 10 causes the occupant 10 to move in a substantially car-forward direction, as indicated by the reference arrow $D_1$.

Figure 4B:
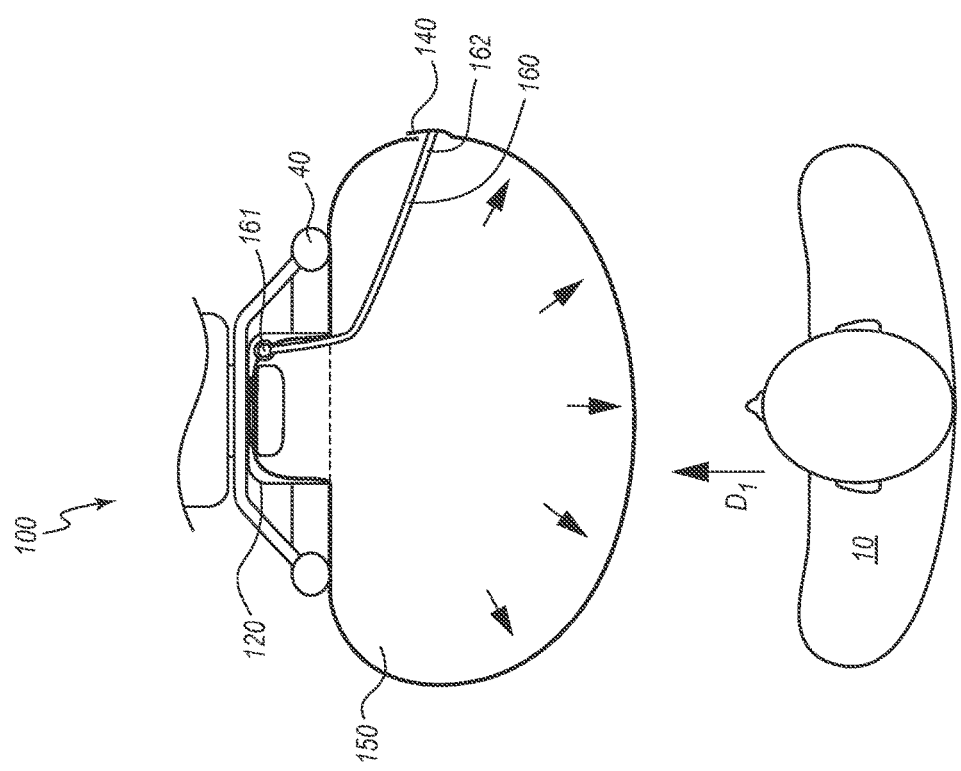
FIG. 4B is a top view of an occupant being received by the deployed inflatable airbag system of FIG. 1.

FIG. 4B is a top view of the occupant 10 and inflatable airbag system 100 of FIG. 4A in a normal deployment, while the occupant 10 is being received by the airbag 150, after having traveled in the forward direction D1. The airbag 150 slightly deforms to the contours of the occupant 10 as the occupant 10 is received by the airbag 150 in the normal deployment. The relatively slight deformation of the airbag 150 to the occupant 10 may be the result of the relatively higher internal gas pressure within the airbag 150 during or after the normal deployment, in which the vent 140 remains closed.

FIG. 5A is a top view of the occupant 10 and inflatable airbag system 100 of FIG. 3 in a soft deployment, and before the occupant 10 is received by the airbag 150. The airbag 150 extends from the steering wheel 40 in the car-rearward direction. In FIG. 5A the airbag 150 may be fully deployed and is also vented at the vent 140. The tether 160 is detached at the first end 161 from the airbag housing 120, which changes or otherwise allows transition of the vent 140 to an open configuration. The open configuration of the vent 140 allows a portion of inflation gas to escape the airbag 150, which decreases pressurization within the airbag 150. As described above, the soft deployment may be triggered by an oblique collision as detected by the one or more vehicle sensors 130 which are coupled to, or in communication with, the control unit 125. When the one or more vehicle sensors 130 detect a sufficient proportion of lateral impact, the control unit 125 sends a signal to the inflatable airbag system 100, which releases the first end 161 of the tether 160 from the airbag housing 120, thereby changing the vent 140 to an open configuration. As will be described below, the soft deployment may be advantageous to providing collision protection for the occupant 10 during an oblique collision, wherein the post-collision trajectory of the occupant 10 causes the occupant 10 to move in an oblique direction, as indicated by reference arrow $D_2$, having a longitudinal car-forward component $D_3$, and a lateral inboard component $D_4$.

FIG. 5B is a top view of the occupant 10 and inflatable airbag system 100 of FIG. 5A during a soft deployment, with the occupant 10 being received by the airbag 150. The occupant 10 is shown striking the airbag 150 off-center, which may be a result of the oblique post-collision trajectory of the occupant 10 during or after an oblique collision. In the soft deployment, the airbag 150 sustains a relatively greater deformation during receipt of the occupant 10 than that of the normal deployment illustrated in FIGS. 4A and 4B. The relatively greater deformation of the airbag 150 to the occupant 10 in the soft deployment may aid in catching or otherwise receiving the occupant 10 and restraining the occupant's lateral movement during or after an oblique collision. In this manner, the inflatable airbag system 100 in soft deployment can limit or prevent the occupant 10 from deflecting or rolling off of the airbag 150, thereby reducing risk of violent or otherwise harmful head rotation, or other potential injuries to the occupant 10 that can arise from the occupant 10 colliding with the instrument panel 60 or other interior surfaces of the vehicle 15.

In the airbag system 100 of FIGS. 1-5B, keeping the tether 160 attached maintains the selectively closeable vent 140 in the closed configuration, and detaching the tether 160 allows the vent 140 to transition to the open configuration. As can be appreciated, in other embodiments, the selectively closeable vent may be configured such that an attached tether causes the selectively closeable vent to assume an open configuration and detaching the tether causes the vent to assume a closed configuration.

In other embodiments, an inflatable airbag system may comprise an airbag that includes a plurality of inflatable chambers separated by internal airbag panels. The internal airbag panels, along with a plurality of external airbag panels, define the plurality of inflatable chambers. Each inflatable chamber may comprise one or more vents, operating independently of the one or more vents of the other inflatable chambers. Thus, during a deployment, a first inflatable chamber configured with a first vent may maintain a relatively higher internal gas pressure by maintaining the first vent in a closed configuration, while a second inflatable chamber configured with a second vent maintains a relatively lower internal gas pressure by changing the second vent to an open configuration, thereby releasing a portion of inflation gas from the second chamber.

FIG. 6 is a top view of an inflatable airbag system 600 mounted in a steering wheel 40 of a vehicle. The inflatable airbag system 600 includes an airbag 650 that includes a first chamber 653 and a second chamber 657. The first chamber 653 and second chamber 657 may be disposed laterally adjacent to one another when the steering wheel 40 is in a normal position (e.g., 0° rotation, to direct the vehicle straight forward), with the first chamber 653 disposed on the outboard side of the airbag 650, and the second chamber 657 on the inboard side of the airbag 650. The inflatable airbag system 600 is shown in a normal deployment, but before the occupant 10 is received by the airbag 650. The inflatable airbag system 600 depicted in FIG. 6 may comprise components that are similar or analogous to components of the inflatable airbag system 100 depicted in FIGS. 1-5B. For example, the inflatable airbag system 600 shown in FIG. 6 comprises an airbag 650 and an airbag housing 620 that may be similar or analogous to the airbag 150 and airbag housing 120 of the inflatable airbag system 100 of FIGS. 1-5B. The inflatable airbag system 600 of FIG. 6 further comprises a first tether 663 having a first end 664 and a second end 665, a second tether 667 having a first end 668 and a second end 669, a first vent 643, and a second vent 647. The tethers 663, 667 and vents 643, 647 of FIG. 6 may be analogous to the tether 160 and vent 140 depicted in FIGS. 2-5B.

Referring to FIG. 6, the first chamber 653 and the second chamber 657 are separated by an interior panel 655. Both chambers 653, 657 are configured to receive inflation gas from an actuator 680, which is located inside the airbag housing 620. The first vent 643 and second vent 647, which are coupled or attached to the first chamber 653 and second chamber 657 respectively, are sustained in a closed configuration during the normal deployment. The normal deployment may be triggered by a frontal collision, which may be detected by a control unit comprising a plurality of sensors. The control unit may send a signal indicating the frontal collision to the inflatable airbag system 600, which allows the first tether 663 and second tether 667 to remain attached at their respective first ends 664, 668 to the airbag housing 620. As the tethers 663, 667 remain attached to the airbag housing 620, the vents 643, 647 remain in the closed configuration, allowing each chamber 653, 657 to maintain a greater internal gas pressure than would otherwise be maintained if the vents 643, 647 were disposed in an open configuration. With the first vent 643 and second vent 647 in the closed configuration, the airbag 650 shown in FIG. 6 may resemble, or behave similarly to, the airbag 150 in the normal deployment shown in FIGS. 4A and 4B.

Figure 7:
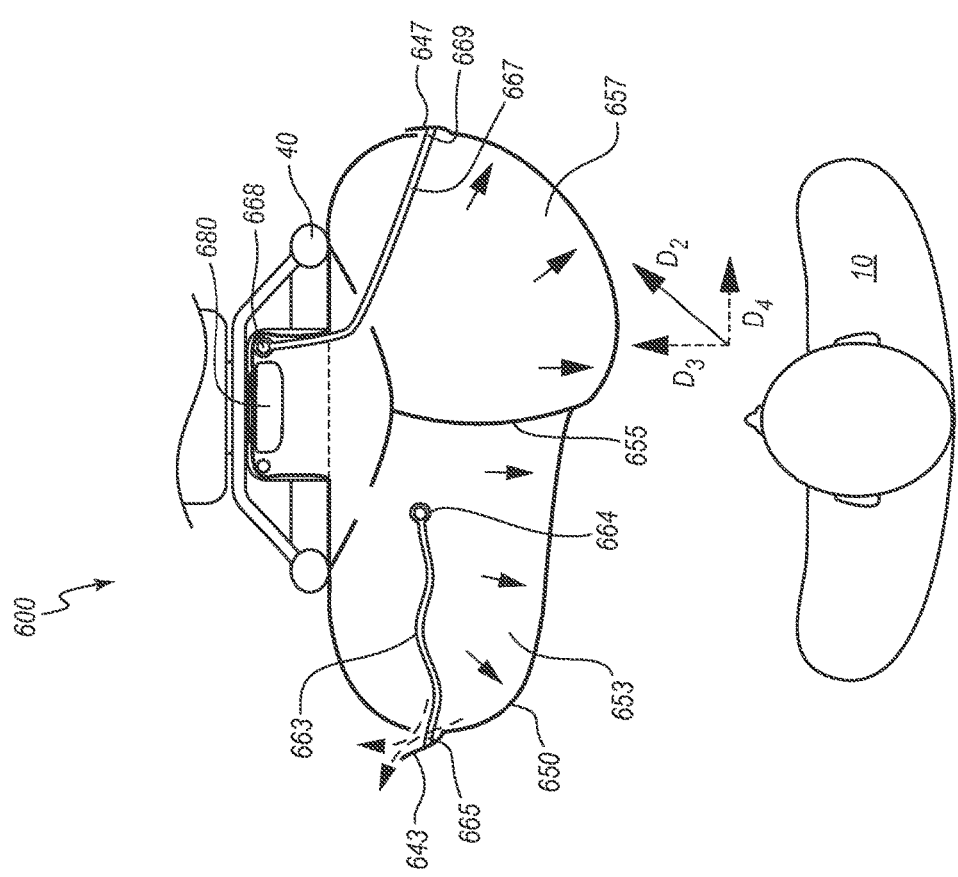
FIG. 7 is a top view of the inflatable airbag system of FIG. 6 in a soft outboard deployment.

FIG. 7 is a top view of the inflatable airbag system of FIG. 6 after a soft outboard deployment, but before the occupant 10 is received by the airbag 650. In the soft outboard deployment, the first chamber 653, which is disposed on the outboard side of the airbag 650, may be vented by detaching the first end 664 of the first tether 663 from the airbag housing 620 to change the first vent 643 to an open configuration. Changing the first vent 643 to an open configuration allows release of a portion of inflation gas from the first chamber 653. Meanwhile, the second vent 647 of the second chamber 657 remains in the closed configuration, thereby maintaining a relatively higher internal gas pressure in the second chamber 657 than the internal gas pressure of the first chamber 653. The differing internal gas pressures of the first chamber 653 and second chamber 657 in the soft outboard deployment may be advantageous to the occupant 10 in an oblique collision. For example, in an oblique collision wherein the inflatable airbag system 600 undergoes a soft outboard deployment, in which the second chamber 657 remains firm and unvented while the first chamber 653 is vented, the airbag 650 may receive the occupant 10 in such a manner as to prevent the occupant 10 from deflecting off of the inboard side of the airbag 650, thereby reducing the possibility of violent or otherwise harmful head rotation, or other injurious contact between the occupant 10 and other surfaces in the vehicle, such as an instrument panel.

The selective actuation of the vents 643, 647 of the first chamber 653 and second chamber 657 described above may depend in part on the orientation of the steering wheel 40. For example, in an oblique collision wherein the occupant 10 has an oblique inboard trajectory, and the steering wheel 40 is oriented at 0°, so as to direct the vehicle along a straight forward path, the control unit may send a signal to detach the first tether 663 in order to change the first vent 643 to an open configuration and vent the first chamber 653 while holding the vent 647 of the second chamber 657 in the closed configuration. By contrast, in an oblique collision wherein the occupant 10 has an oblique inboard trajectory and the steering wheel 40 is oriented at 180, the control unit may send a signal to detach the second tether 667 in order to change the second vent 647 to an open configuration and vent the second chamber 657. In other words, by inverting the orientation of the steering wheel 40 by 180°, the control unit may compensate for the inverted steering wheel orientation by venting the second chamber 657, instead of the first chamber 653, in order to emulate the soft outboard deployment in which the steering wheel 40 was oriented at 0°.

Figure 8:
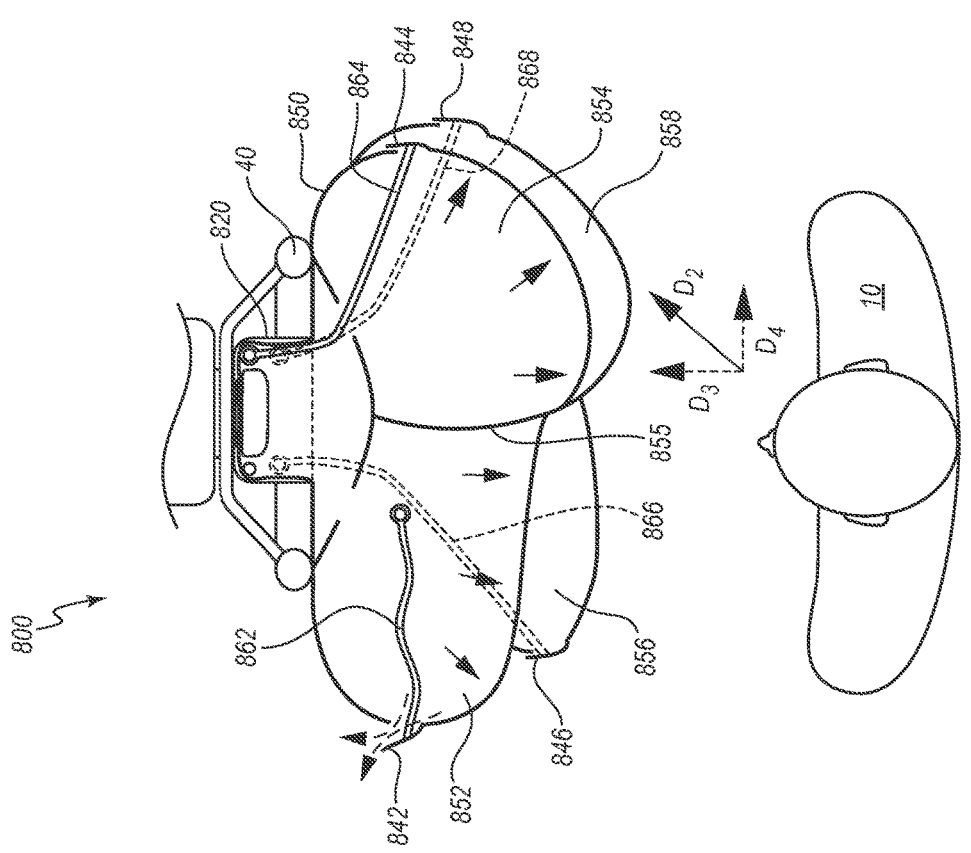
FIG. 8 is a top view of an inflatable airbag system comprising multiple chambers in a soft outboard deployment.

FIG. 8 is a top view of an embodiment of an inflatable airbag system 800, according to another embodiment, that includes an airbag 850 with four inflatable chambers 852, 854, 856, 858. It may be readily understood that some components of the inflatable airbag system 800 of FIG. 8 are analogous to some components of the inflatable airbag system 600 of FIGS. 6 and 7. For example, in the embodiment shown in FIG. 8, the inflatable airbag system 800 comprises a plurality of tethers 862, 864, 866, 868 and corresponding vents 842, 844, 846, 848 which may be analogous to the tethers 663, 667 and vents 643, 647 depicted in the inflatable airbag system 600 of FIGS. 6 and 7. The inflatable airbag system 800 of FIG. 8 may further comprise one or more internal panels 855, configured to separate and define the plurality of chambers 852, 854, 856, 858.

Referring to FIG. 8, the inflatable airbag system 800 comprises a first inflatable chamber 852, a second inflatable chamber 854, a third inflatable chamber 856, and a fourth inflatable chamber 858, which are disposed adjacent one another and are separated and defined by the one or more internal panels 855 disposed inside of the airbag 850. The inflatable airbag system 800 is shown after an oblique collision but before the occupant 10 is received by the airbag 850. Similar to the embodiment depicted in FIGS. 6 and 7, an oblique collision may trigger a soft outboard deployment of the inflatable airbag system 800, wherein one or more chambers which are disposed on the outboard side of the inflated airbag 850 are vented, while one or more chambers which are disposed on the inboard side of the airbag 850 are unvented. The relative position of the chambers 852, 854, 856, 858 may depend on the orientation of the steering wheel 40. For example, when the steering wheel 40 is oriented at 0°, so as to direct the vehicle along a straight path, the first chamber 852 and third chamber 856 may be disposed on the outboard side of the airbag 850. By contrast, when the steering wheel 40 is oriented at 90°, so as to direct the vehicle along a clockwise path, the third chamber 856 and fourth chamber 858 may be disposed on the outboard side of the airbag 850. Thus, in an oblique collision wherein the steering wheel 40 is oriented at 90°, so as to direct the vehicle along a clockwise path, the control unit may compensate for the orientation of the steering wheel 40 by venting the third chamber 856 and fourth chamber 858 in order to emulate the soft outboard deployment in which the steering wheel was oriented at 0°. Still further, when the steering wheel 40 is oriented at 180°, the second chamber 854 and the fourth chamber 858 may be disposed on the outboard side of the airbag 850. Thus, in an oblique collision wherein the steering wheel 40 is oriented at 180° the control unit may compensate for the orientation of the steering wheel 40 by venting the second chamber 854 and the fourth chamber 858 in order to emulate the soft outboard deployment in which the steering wheel was oriented at 0°.

In other embodiments, the airbag may include different numbers of chambers than the embodiments depicted, such as three, five, six, or any appropriate number of chambers.

Figure 9:
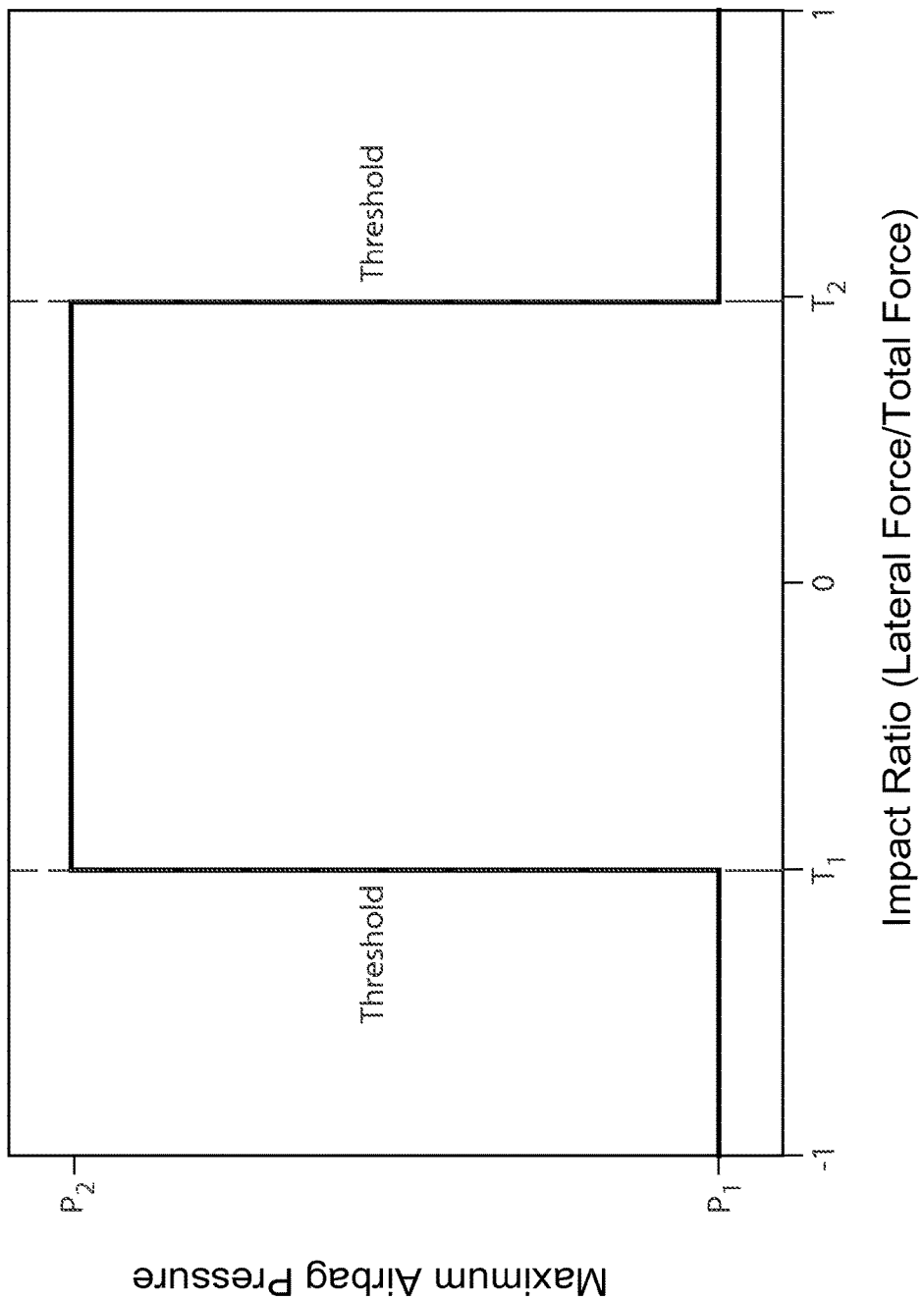
FIG. 9 is a graphical representation of a configuration of an inflatable airbag system comprising an actuatable vent.

FIG. 9 depicts a graphical representation of a configuration of an inflatable airbag system, in terms of a maximum internal gas pressure of an inflatable airbag system with respect to a continuum of possible modes of collision of a vehicle. The vertical axis, or "y" axis, represents a continuum of maximum internal gas pressures of a deployed airbag, wherein greater maximum internal gas pressures are shown at higher locations along the vertical axis, and lower maximum internal gas pressures are shown at lower locations along the vertical axis. For example, $P_2$, which is near the top of the vertical axis, represents a relatively greater maximum internal gas pressure than $P_1$, which is shown toward the bottom of the vertical axis. The horizontal axis, or "x" axis, represents a continuum of modes of collision as defined by an impact ratio, which is defined by a lateral impact force divided by a total impact force. In oblique collisions, the lateral impact force may have a negative or positive value. Whether a lateral impact force value is negative or positive may depend on the direction of the lateral impact force vector with respect to the vehicle. For example, if the vehicle is in a collision wherein the driver side of the vehicle collides with another vehicle or object, the lateral impact force may be represented by a negative value. If the vehicle is in a collision wherein the passenger side of the vehicle collides with another vehicle or object, the lateral impact force may be represented by a positive value. An impact ratio of 0 represents a frontal collision with no lateral impact force, and an impact ratio of 1 or −1 represents a lateral impact, wherein all of the impact force is oriented in a lateral direction.

Referring still to FIG. 9, it will be readily apparent that as the impact ratio of a collision reaches a threshold force $T_1$, $T_2$, the maximum internal gas pressure of the airbag shifts from a vented pressure $P_1$ to an unvented pressure $P_2$. Vented pressure $P_1$ may represent the soft deployment described in FIGS. 1-5B, while unvented pressure $P_2$ may represent the normal deployment described in FIGS. 1-5B. The reason for the difference in the maximum internal gas pressure during a collision with an impact ratio within the threshold forces versus a collision with an impact ratio outside the threshold forces may be the actuation of one or more vents of the airbag which allow a portion of inflation gas to escape the airbag during or after deployment when an oblique collision is detected by a control unit.

In other embodiments, a mode of collision or type of collision may be determined based on other than a ratio of the lateral impact force divided by a total impact force. For example, the mode of collision may be determined based on a ratio of lateral force to longitudinal force. Other ratios may also be utilized and/or substituted to determine a mode of collision.

The venting configurations depicted in FIGS. 1-8 could be replaced by a number of venting configurations to achieve a similar result. For example, in other embodiments, one or more vents may be configured with one or more tethers such that detaching a first end of each tether from an airbag housing before, during or after deployment, maintains the one or more vents in a closed configuration, while keeping the first ends of the one or more tethers attached at the airbag housing allows the vent to open.

Figure 10B:
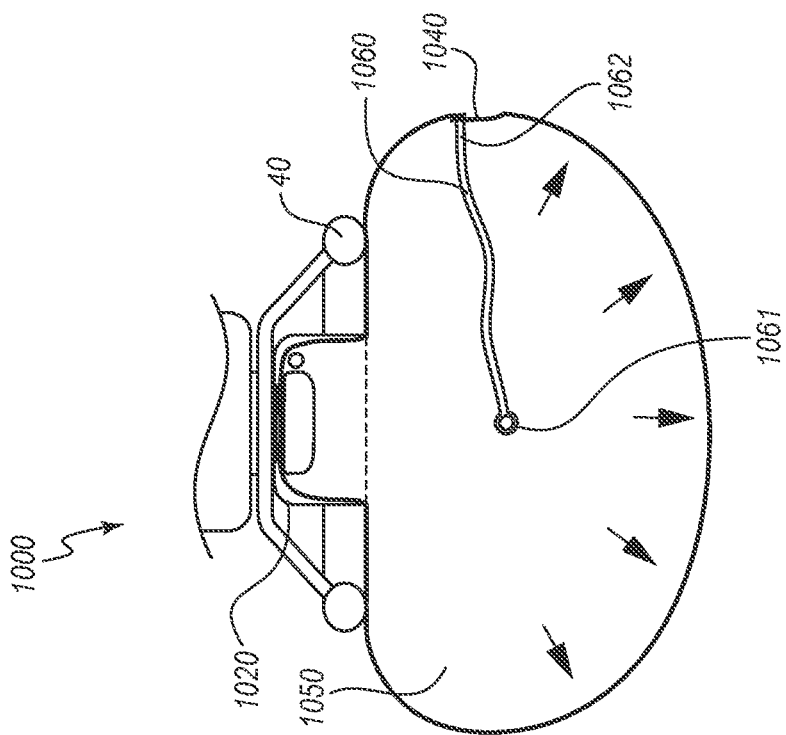
FIG. 10B is a top view of the inflatable airbag system of FIG. 10A deployed to a first configuration.
Figure 10A:
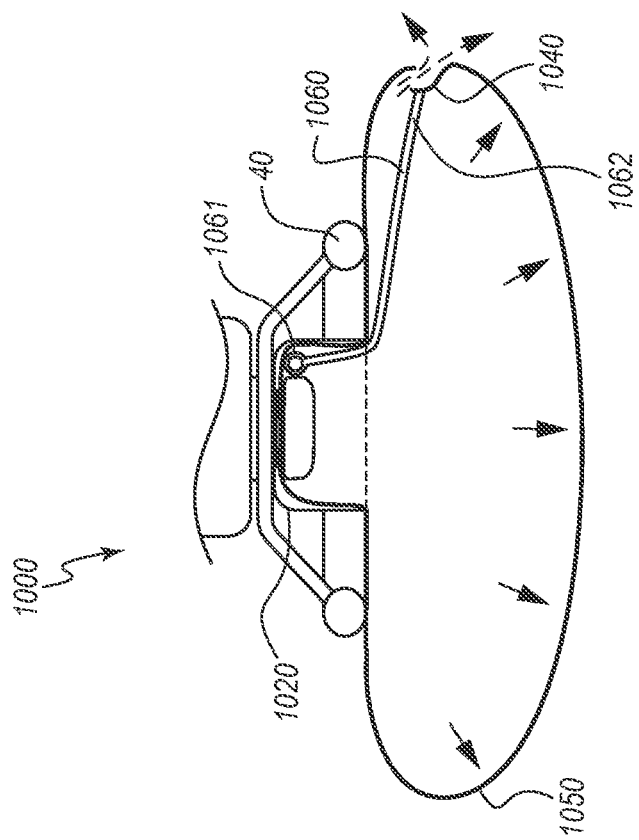
FIG. 10A is a top view of an inflatable airbag system, according to another embodiment of the present disclosure, deployed to a second configuration.

FIGS. 10A and 10B illustrate another embodiment of an inflatable airbag system 1000 including an airbag 1050 having another embodiment of a vent 1040 that may be used in conjunction with the inflatable airbag systems described herein.

FIG. 10A is a top view of the inflatable airbag system 1000 deployed to a second configuration, which may be a soft deployment. The airbag 1050 deploys in the car-rearward direction from an airbag housing 1020 mounted in the steering wheel 40. In FIG. 10A the airbag 150 may be fully deployed and is also vented at the vent 1040. A tether 1060 is attached at a first end 1061 to the airbag housing 1020 and is also attached at a second end 1062 to the vent 1040, which sustains the vent 1040 in an open configuration. The open configuration of the vent 1040 allows a portion of inflation gas to escape the airbag 1050, which decreases pressurization within the airbag 1050. As described above, the soft deployment may be triggered by an oblique collision as detected by one or more vehicle sensors which are coupled to, or in communication with a control unit. As described above, the soft deployment may be advantageous to providing collision protection for an occupant during an oblique collision, wherein the post-collision trajectory of the occupant causes the occupant to move in an oblique direction having a longitudinal car-forward component and a lateral inboard component.

FIG. 10B is a top view of the inflatable airbag system 1000 of FIG. 10A deployed to a first configuration, which may be a normal deployment. The airbag 1050 extends from the steering wheel 40 in the car-rearward direction, fully deployed and unvented. The tether 1060 is detached at the first end 1061 from the airbag housing 1020, which allows the vent 1040 to transition to a closed configuration. As described above, in a normal deployment, the deployed airbag 1050 may maintain a relatively higher internal gas pressure (e.g., as compared to that of the deployed airbag 1050 in a soft deployment), which may be advantageous to providing collision protection to an occupant in the event of a frontal impact, wherein the post-collision trajectory of the occupant causes the occupant to move in a substantially car-forward direction.

Those having skill in the art recognize that many changes may be made to the details of the above-described embodiments without departing from the underlying principles of the invention. For example, in other embodiments, an inflatable airbag system may employ other varieties of vents and vent actuation mechanisms. For example, the inflatable airbag system may comprise an electric motor, a pyrotechnic apparatus, an electromagnet, or other actuation mechanisms in order to change one or more vents to an open configuration. Furthermore, any of these vent actuation mechanisms may be used with or without a tether in order to manipulate the configuration of the one or more vents.

In other embodiments, an inflatable airbag system may comprise one or more airbags or inflatable chambers configured with a plurality of selectively actuatable vents that may be of the same or different varieties. Thus, in some embodiments, a single vent of an airbag or inflatable chamber could be opened during or after a collision with a first impact force ratio, and two or more vents of an airbag or inflatable chamber could be opened during or after a collision with a second impact force ratio. In still other embodiments, an airbag may be configured with any number of inflatable chambers (e.g., three, five, six, etc.), each chamber comprising one or more selectively actuatable vents, some of which may be opened to vent one or more inflatable chambers in the event of an oblique collision.

It will be obvious to those having skill in the art that many changes may be made to the details of the above-described embodiments without departing from the underlying principles of the invention. The scope of the present invention should, therefore, be determined only by the following claims.

What is claimed is:

1. An inflatable airbag system comprising:
   a housing from which an inflatable airbag cushion deploys;
   an inflatable airbag cushion that is deployable from the housing in response to an impact event of a vehicle to receive a vehicle occupant during the impact event, the inflatable airbag cushion comprising one or more panels defining an inflatable chamber;
   a selectively actuatable vent disposed in a panel of the one or more panels of the inflatable airbag cushion, the selectively actuatable vent having a closed configuration and an open configuration, wherein the closed configuration limits passage of inflation gas out of the inflatable chamber and the open configuration allows passage of inflation gas out of the inflation chamber; and
   a vent actuation mechanism that, if the impact event is an oblique impact event, causes the selectively actuatable vent to be in the open configuration, the vent actuation mechanism comprising a tether having a first end and a second end, the first end coupled to the housing and the second end coupled to the selectively actuatable vent, wherein the first end of the tether is configured to be uncoupled from the housing if the impact event is an oblique impact event.

2. The airbag system of claim 1, wherein the selectively actuatable vent comprises:
   a vent aperture defined through the panel of the inflatable airbag cushion to allow inflation gas within the inflatable chamber to escape out of the inflatable chamber; and
   a vent aperture occlusion element to block the vent aperture in the closed configuration to limit passage of inflation gas through the vent aperture, the vent aperture occlusion element actuatable to unblock the vent aperture in the open configuration to allow passage of inflation gas through the vent aperture.

3. The airbag system of claim 2, wherein the tether is in an uncoupled state when the vent aperture occlusion element is in the open configuration.

4. The airbag system of claim 2, wherein the vent actuation mechanism comprises a tether cutter that, when activated, cuts the tether to allow the vent aperture occlusion element to transition to the open configuration.

5. The airbag system of claim 2, wherein the vent aperture occlusion element comprises one of:
   a flap;
   a patch; and
   a plug.

6. The airbag system of claim 1, further comprising a control unit configured to receive input from one or more sensors and determine an impact type of the impact event and to provide a signal to the vent actuation mechanism indicating that impact type is one of an oblique impact event and a frontal impact event.

7. The airbag system of claim 1, further comprising an actuator activatable to provide inflation gas into the inflatable chamber to deploy and expand the inflatable airbag cushion, the actuator to be activated at occurrence of the impact event.

8. The airbag system of claim 1, wherein the housing is configured to be mounted to a steering wheel of the vehicle.

9. The airbag system of claim 1, wherein the housing is configured to be mounted in an instrument panel of the vehicle.

10. The airbag system of claim 1, wherein the vent actuation mechanism comprises one of:
    a motor;
    a pyrotechnic; and
    an electromagnet.

11. An inflatable airbag system for cushioning restraint of a vehicle occupant during an impact event of a vehicle, the inflatable airbag system comprising:
    a control unit configured to receive input from one or more sensors and determine an impact ratio of the impact event, and to provide a signal based on the impact ratio complying with predetermined conditions;
    an inflatable airbag cushion configured to deploy from a housing to receive the vehicle occupant during the impact event, the inflatable airbag cushion comprising one or more panels defining an inflatable chamber;
    an actuator activatable to provide inflation gas into the inflatable chamber to deploy and expand the inflatable chamber, the actuator to be activated at occurrence of the impact event;
    a selectively actuatable vent disposed in a panel of the one or more panels of the inflatable airbag cushion, the selectively actuatable vent comprising:
       a vent aperture defined through the panel of the inflatable airbag cushion to allow inflation gas within the inflatable chamber to escape out of the inflatable chamber; and
       a vent aperture occlusion element to block the vent aperture in a closed configuration to limit passage of inflation gas through the vent aperture, the vent aperture occlusion element actuatable to an open configuration to unblock the vent aperture to allow passage of inflation gas through the vent aperture; and a vent actuation mechanism to actuate the selectively actuatable vent to transition the vent aperture occlusion element between the closed configuration and the open configuration, based on the signal from the control unit, the vent actuation mechanism comprising a tether having a first end and a second end, the first end configured to be coupled to the housing and the second end coupled to the selectively actuatable vent, wherein the tether is in a coupled state when the vent aperture occlusion element is in the closed configuration, and wherein the first end of the tether is configured to be uncoupled from the housing if the impact event is an oblique impact event.

12. The airbag system of claim 11, wherein the impact ratio complying with the predetermined conditions indicates the oblique impact event.

13. The airbag system of claim 11, wherein the control unit provides the signal to actuate the vent actuation mechanism based on whether the impact event is the oblique impact event.

14. The airbag system of claim 11, wherein the vent actuation mechanism comprises a tether cutter that, when activated, cuts the tether to allow the vent aperture occlusion element to transition to the open configuration.

15. The airbag system of claim 11, wherein the tether is in an uncoupled state when the vent aperture occlusion element is in the open configuration.

16. An inflatable airbag system comprising:

an inflatable airbag cushion that is configured to be deployable from a housing in response to an impact event of a vehicle to receive a vehicle occupant during the impact event, the inflatable airbag cushion defining an inflatable chamber;

a selectively actuatable vent disposed in an outer panel of the inflatable airbag cushion, the selectively actuatable vent having a closed configuration and an open configuration, wherein the closed configuration limits passage of inflation gas out of the inflatable chamber and the open configuration allows passage of inflation gas out of the inflation chamber;

a vent actuation mechanism that receives input indicating an impact type, wherein the vent actuation mechanism causes the selectively actuatable vent to be in the closed configuration if the impact event is a frontal impact event, and causes the selectively actuatable vent to be in the open configuration if the impact event is an oblique impact event, and wherein the vent actuation mechanism comprises a tether having a first end and a second end, the first end configured to be coupled to the housing and the second end coupled to the selectively actuatable vent, wherein the first end of the tether is configured to be uncoupled from the housing if the impact event is an oblique impact event; and a control unit configured to receive input from one or more sensors and determine an impact ratio of the impact event, and to provide a signal indicating the impact type, based on the impact ratio.

17. The airbag system of claim 16, wherein the selectively actuatable vent comprises:

a vent aperture defined through the outer panel of the inflatable airbag cushion to allow inflation gas within the inflatable chamber to escape out of the inflatable chamber; and a vent aperture occlusion element to block the vent aperture in the closed configuration to limit passage of inflation gas through the vent aperture, the vent aperture occlusion element actuatable to unblock the vent aperture in the open configuration to allow passage of inflation gas through the vent aperture.

* * * * *